UNITED STATES PATENT OFFICE.

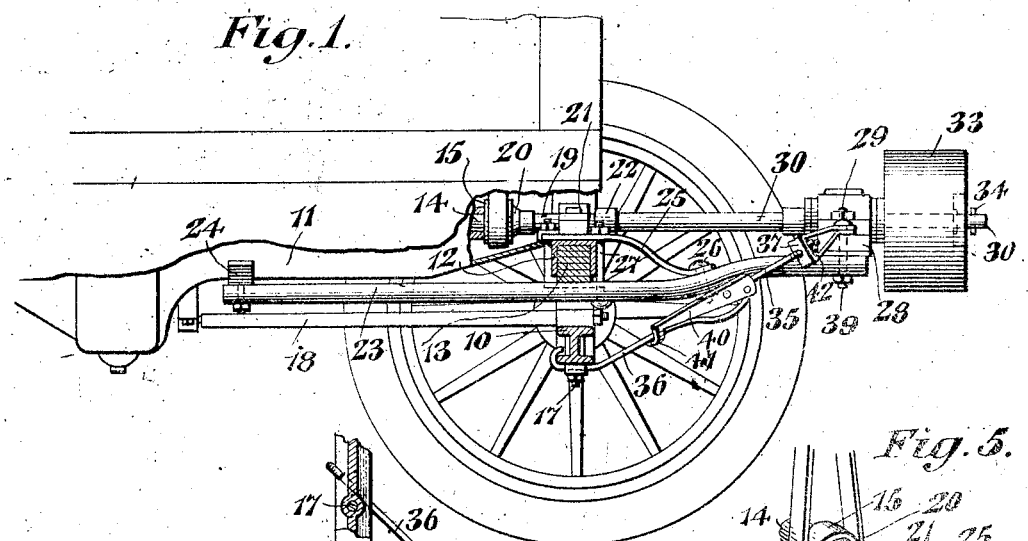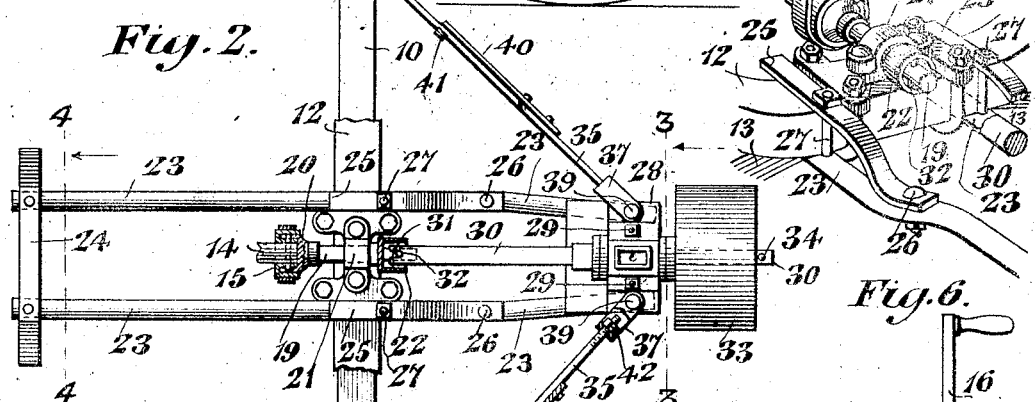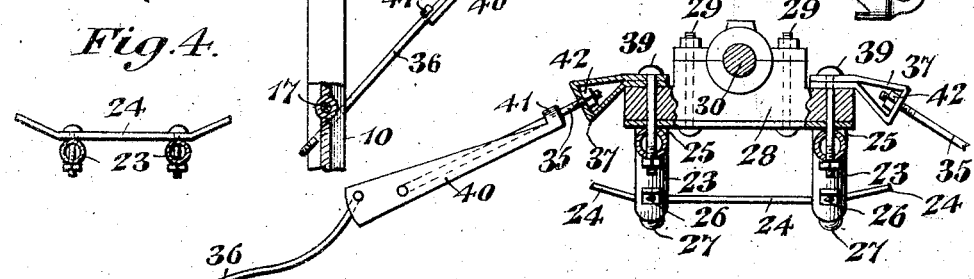

WILLIAM SCHLUTER, OF PARKERSBURG, IOWA.

BELT ATTACHMENT FOR MOTOR-VEHICLES.

1,238,946.

Specification of Letters Patent.

Patented Sept. 4, 1917.

Application filed July 5, 1916. Serial No. 107,672.

*To all whom it may concern:*

Be it known that I, WILLIAM SCHLUTER, a citizen of the United States, residing at Parkersburg, in the county of Butler and State of Iowa, have invented a new and useful Belt Attachment for Motor-Vehicles, of which the following is a specification.

The present invention relates to an attachment for motor vehicles, by means of which the power of the driving motor of the vehicle may be utilized for driving various stationary machines or devices.

An object of the present invention is to provide an attachment of this character which may be easily and quickly applied and removed from the vehicle without the tightening of screws, nuts, or the like, and which, when not in use, may be completely detached from the vehicle, so as not to detract from the appearance of the same, or to place unnecessary load upon the motor when operating the vehicle.

Another object of this invention is to provide a relatively simple, strong attachment, which may be easily handled, which comprises relatively few parts, and which may be economically manufactured.

The above and other objects and advantages of this invention will be more particularly brought out in the following specific disclosure of the present preferred embodiment of this invention, the same being illustrated in the accompanying drawing, wherein—

Figure 1 is a side elevation of the attachment as applied to a motor vehicle, the latter being shown partly in section.

Fig. 2 is a top plan view of the attachment, parts of the vehicle being shown.

Fig. 3 is a transverse section through the attachment on the line 3—3 of Fig. 2, looking rearwardly in the direction indicated by the arrow.

Fig. 4 is a transverse section through the rear end of the attachment on the line 4—4 of Fig. 2, looking in the direction indicated by the arrow, and showing the rest or bridge-piece for supporting the inner end of the attachment.

Fig. 5 is a fragmentary perspective view of the forward end of the vehicle, showing the stub shaft which is permanently mounted on the vehicle.

Fig. 6 is a detail view of the crank handle employed.

Referring to this drawing, the attachment is disclosed as applied to a motor vehicle of that type known as the "Ford," although it is to be understood that by a slight modification the attachment may be applied to other motor vehicles of the same general construction.

The motor vehicle shown has an axle 10, a motor, indicated generally by 11, and a front frame bar 12, which is joined to the axle 10 by the transverse semi-elliptic spring 13 in the usual manner. As will be noted from Fig. 5, the frame bar 12 is arched downwardly at its middle portion, and the spring 13 is arched upwardly at its middle portion, the two members meeting at their central portions intermediate the sides of the vehicle. The motor 11 has a crank shaft 14, upon which is mounted the fan pulley 15, the latter comprising one member of a clutch usually employed for interlocking engagement with the crank handle 16.

The axle 10 has near its ends vertically extending bolts 17 secured to the forward ends of radius rods 18 which extend rearwardly, and are secured at their rear ends beneath the motor 11, in the usual manner. The bolts 17 project below the axle 10 in the usual manner, as shown in Fig. 1.

The improved attachment comprises a stub shaft 19, which is relatively short, provided with a clutch member 20 for coöperation with the clutch pulley 15, and adapted to be driven by the pulley 15. The stub shaft 19 projects forwardly through a bearing 21, usually mounted on the intermediate portion of the front frame bar 12, and has a socket 22 on its forward end immediately in front of the bearing 21. This stub shaft 19, with its clutch member 20 and socket 22, is permanently mounted on the vehicle and adapted to take the place of the long shank usually carried upon the crank handle 16. This is the only part of the attachment of this invention which remains permanently upon the vehicle, and it provides means for connecting the attachment to the motor.

A pair of spaced apart bars 23 are adapted for engagement beneath the forward end of the vehicle. These bars 23 are held in spaced apart relation at their rear ends by a bridge-piece or rest 24, having its opposite ends beyond the bars 23 turned upwardly at a slight angle, as shown to advantage in Fig. 4, to conform to and fit against the under side of the casing of the motor 11.

These curved ends hold the bars 23 from lateral displacement. The intermediate portions of the bars 23 are adapted to bear against the under side of the spring 13, at the opposite sides of the bearing 21. Anchoring arms 25 are secured at their forward ends to the bars 23 by bolts 26, or the like, and are offset upwardly from the bars 23 for engagement over the upper face of the front frame bar 12.

Adjusting bolts 27 connect the intermediate portions of the arms 25 to the bars 23 rearwardly of the bolts 26 to adjust the arms toward and from the bars and provide for a snug engagement of the attachment about the spring 13 and frame bar 12. The arms 25 support the forward ends of the bars 23, and as the bridge-piece 24 rests against the under side of the motor 11, the bars 23, or frame of the attachment, are held in substantially a horizontal position.

The outer ends of the bars 23 are preferably offset upwardly, and support, and are held in spaced relation by, a transversely extending bearing block 28. The block 28 is preferably of the usual split or two-part form, the parts being held together by clamping bolts 29. A drive shaft 30 is journaled in this bearing block 28 and extends longitudinally of the motor vehicle, the rear end of the shaft having a notch 31 adapted to receive a diametrically extending pin 32 in the socket 22. The pin 32 thus connects the drive shaft 30 to the stub shaft 19.

A suitable drive pulley 33 is mounted upon the outer end of the drive shaft 30, beyond the bearing block 28, and, as shown in Fig. 1, is spaced forwardly from the vehicle to an extent sufficient to clear the front wheels of the vehicle and admit the application of a belt to the pulley for driving stationary machinery of various kinds. The forward extremity of the drive shaft 30 beyond the pulley 33 is preferably provided with a diametrically extending pin 34 adapted to be engaged by the socketed inner end of the crank handle 16, for the purpose of starting or cranking the motor 11.

It will be observed, particularly from Figs. 2 and 6, that the pin 32 in the socket 22, and the pin 34 on the outer end of the drive shaft 30, are of the same dimensions, so that when the attachment is applied, the crank handle 16 may be used to turn the motor through the drive shaft 30 and the stub shaft 19, and when the attachment is removed, the crank handle may turn the motor through the stub shaft 19 only.

Quickly detachable stay rods are employed for holding the attachment against the forward end of the vehicle. Each stay rod comprises a swiveled section 35, and a hooked section 36. The swiveled section 35 is threaded at one end and slidably engaged through a strap or loop 37, the latter being secured to the outer stepped end of the bearing block 28 by a bolt 39, which passes through the loop 37, the end of the bearing block 28 and through the adjacent frame bar 23 to hold all of these members in assembled relation.

The hooked or free section 36 of each stay rod is overturned at its free end to provide a hook for engagement with the axle 10, preferably outwardly of the radius rod bolts 17, the latter engaging the rod sections 36, and holding them from sliding inwardly toward each other along the axle. The inner adjacent ends of the rod sections 35 and 36 are pivoted in spaced apart relation to one end of a contracting lever 40, as shown to advantage in Fig. 3. This lever 40 is adapted to be swung from the open position, shown in Fig. 3, to the closed position, shown in Figs. 1 and 2, to draw the rod sections 35 and 36 toward each other longitudinally, and overlap the pivoted ends of the same to contract the stay rod and bind the hook thereof upon the axle.

A locking lip 41 is carried on the lever 40 and is curved for engagement, when the stay rod is contracted, about the hooked section 36 to hold the rod in overturned position. An adjusting nut 42 is threaded upon the end of the section 35 within the strap or loop 37 to longitudinally adjust the rod section 35 upon the loop.

Preferably, the hooked section 36 of the stay rod is arched downwardly near its pivoted end to admit of the complete overturning of the locking lever 40. Fig. 5 shows the stub shaft 19 in its permanently mounted position on front of the vehicle, and when the attachment is to be applied, the bars 23 are merely inserted beneath the spring 13 and slid inwardly therebeneath until the anchoring arms 25 engage over the frame bar 12 of the vehicle, the inward movement of the attachment being limited by engagement of the adjusting bolts 27 against the front of the frame bar 12. The rest 24 bears against the under side of the motor 11 to support the attachment from tilting downwardly at its forward end.

The stay rods are now extended or opened, as shown in Fig. 3, and the hooks thereof are engaged about the axle 10. The contracting or locking levers 40 are now swung over to overlap the pivoted ends of the rod sections 35 and 36, and are secured in such position by engagement of the locking lips 41 about the hooked sections 36. These levers 40 draw the attachment rearwardly against the vehicle and hold the notched end of the drive shaft 30 in the socket 22, and also bind the arms 25 and the bars 23 in position.

The motor may now be started by the usual crank handle 16, the latter being now applied to the pin 34 on the outer end of the drive shaft, and the speed of the shaft 30 is under the control of the throttle of the engine.

What is claimed is:—

1. A belt attachment for motor vehicles comprising a frame adapted to fit beneath the forward end of the vehicle and to project forwardly from the same, a drive shaft on the frame in line and for interlocking engagement with the crank shaft of the vehicle motor, a pulley on said drive shaft, anchoring arms on the intermediate portion of the frame for engagement with the vehicle to support the frame, a rest on the rear end of the frame for engagement beneath the vehicle to hold the frame in a substantially horizontal position, and detachable stay rods mounted on the forward end of the frame for engagement with the vehicle to bind the frame thereagainst and hold the drive shaft in engagement with the crank shaft.

2. A belt attachment for motor vehicles comprising a frame adapted for engagement beneath the vehicle between the axle and the spring, a drive shaft mounted on the frame and adapted for interlocking engagement with the shaft of the vehicle motor, supporting means on an intermediate portion of the frame for engagement with the vehicle, means at the rear end of the frame to prevent the latter from swinging about said supporting means, and detachable stay rods on the outer end of the frame for engagement with the vehicle to bind the supporting means and said means against the vehicle and retain the frame in place.

3. In combination with a motor vehicle having a crank shaft with the usual crank handle socket thereon, a stub shaft permanently journaled upon the frame of the vehicle in line with the crank shaft, engaging at one end in said socket and having its outer end projecting beyond the vehicle frame, a second socket on the outer end of said stub shaft beyond the vehicle frame, a supporting frame arranged in a plane beneath the stub shaft and extending forwardly from the vehicle, a bearing on said frame, a drive shaft journaled in the bearing and detachably engaging at its rear end in said second socket and adapted to turn the crank shaft through the stub shaft, and means for detachably mounting said supporting frame on the frame of the vehicle, whereby upon the removal of the frame with the drive shaft carried thereby, the crank shaft of the engine may be operated by applying a crank to said second socket.

4. A belt attachment for motor vehicles comprising a frame adapted to fit beneath the forward end of the vehicle and to project forwardly from the same, a drive shaft journaled on the frame at the forward end thereof in line and for interlocking engagement with the crank shaft of the motor vehicle, a pulley on said drive shaft, anchoring arms on the intermediate portion of the frame for engagement with the vehicle to support the frame, and a rest on the rear end of the frame for engagement beneath the vehicle to hold the frame in a substantially horizontal position.

5. A belt attachment for motor vehicles comprising a frame adapted for engagement beneath the vehicle between the axle and the spring, a drive shaft journaled on the frame at the forward end thereof and adapted for interlocking engagement with the shaft of the motor vehicle, supporting means on an intermediate portion of the frame for engagement with the vehicle, and means at the rear of the frame to prevent the latter from swinging about said supporting means.

6. A belt attachment for motor vehicles comprising a frame formed of two spaced bars adapted to be fitted on the under side of the vehicle above the axle and forward of the motor, a drive shaft journaled on the forward end of the frame and adapted for interlocking engagement with the crank shaft of the motor to be driven thereby, the drive shaft being arranged in a higher plane than said bars, means connecting the intermediate portions of said bars to a fixed part of the frame of the vehicle above the axle, and a bridge connecting the bars at their rear and engaging the vehicle to prevent the frame from swinging about said means.

7. A belt attachment for motor vehicles comprising a pair of spaced bars adapted to extend beneath the front transverse spring of the vehicle, means secured to the intermediate portions of the bars for engagement over the front transverse bar of the vehicle frame to suspend the said bars, a bearing mounted on the outer ends of the bars, a drive shaft journaled in the bearing and adapted to engage the crank shaft of the motor vehicle, and means for preventing the rotation of said bars around the intermediate engaging means.

8. A belt attachment for motor vehicles comprising a frame formed of two spaced apart bars adapted to be fitted on the under side of the vehicle above the axle and forward of the motor, a drive shaft mounted on the frame and adapted for interlocking engagement with the crank shaft of the motor to be driven thereby, the drive shaft being arranged in a higher plane than the said bars, means connecting the intermediate portion of said bars to a fixed part of the frame of the vehicle above the axle, and stay rods one on each side of the frame and connecting the forward end of the same with the axle.

9. The combination with a motor vehicle having a crank shaft thereon, of a stub shaft mounted on the vehicle and having interlocking engagement with the crank shaft, a pair of spaced bars adapted to extend beneath the front transverse spring of the vehicle, means secured to the intermediate portions of the bars for engagement over the front transverse bar of the vehicle frame to suspend said bars, a bearing mounted on the outer ends of the bars, a drive shaft in the bearing adapted for engagement with said stub shaft, and detachable means carried by the outer ends of the bars for engagement with the axle of the vehicle to draw the outer ends of the bars downwardly and bind the arms against the frame.

10. A belt attachment for motor vehicles comprising a frame adapted to fit beneath the forward end of the vehicle in line with the motor, a drive shaft on the frame adapted for interlocking engagement with the crank shaft of the motor to be driven thereby, a pulley on said drive shaft, and binding means carried by the frame for engagement with the vehicle to hold the frame in position, said binding means including a pair of stay rods, each of which is formed of two sections, one being attached to the frame and the other provided with a hook for engagement with the vehicle, and a contracting lever pivotally connected to the free ends of said sections and adapted to be swung to overlap the free pivoted ends of the sections and bind the frame against the vehicle, and means on said lever for engagement with one of the sections to hold the lever in locked position.

11. A belt attachment for motor vehicles comprising a frame adapted to fit beneath the forward end of the vehicle in substantial alinement with the motor and project from said forward end, a drive shaft on the frame arranged at a higher plane and adapted for interlocking engagement with the crank shaft of the motor to be driven thereby, means on said drive shaft for conveying the power to a suitable source, and means connecting the forward end of the frame with the axle of the vehicle to hold the frame in position, said means including stay rods on each side, each stay rod comprising a swiveled section and a hook section, and a lever for connecting the sections together.

In testimony that I claim the forgoing as my own, I have hereto affixed my signature in the presence of two witnesses.

WILLIAM SCHLUTER.

Witnesses:
J. V. GREGORY,
GEO. JOHNSON.